No. 819,664. PATENTED MAY 1, 1906.
L. P. LOWE.
APPARATUS FOR SEPARATING RESIDUES FROM LIQUIDS.
APPLICATION FILED MAY 17, 1904.
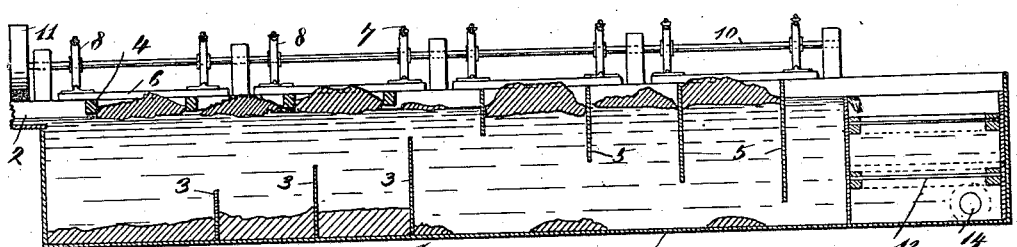
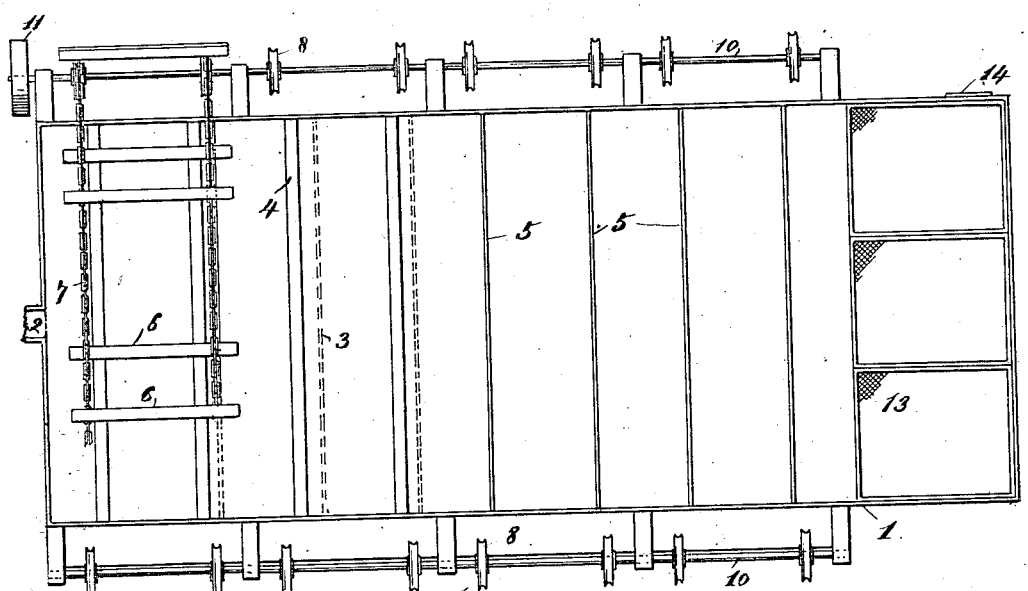
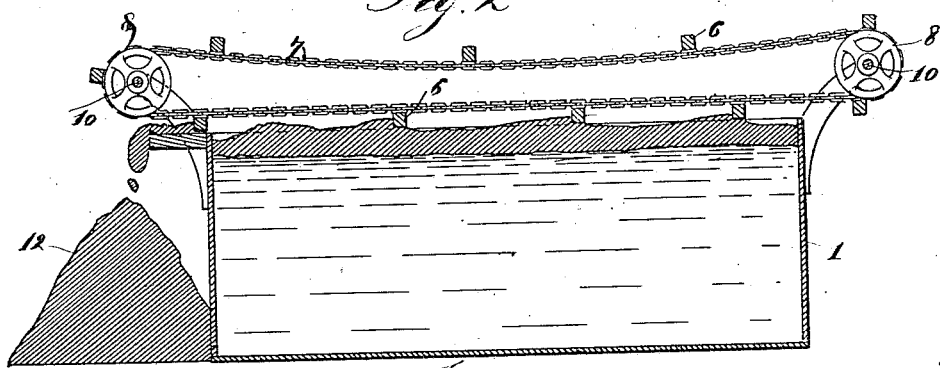

UNITED STATES PATENT OFFICE.

LEON P. LOWE, OF SAN FRANCISCO, CALIFORNIA.

APPARATUS FOR SEPARATING RESIDUES FROM LIQUIDS.

No. 819,664.     Specification of Letters Patent.     Patented May 1, 1906.

Application filed May 17, 1904. Serial No. 208,344.

*To all whom it may concern:*

Be it known that I, LEON P. LOWE, a citizen of the United States, residing at San Francisco, in the county of San Francisco and State of California, have invented certain new and useful Improvements in Apparatus for Separating Residues from Liquids, of which the following is a specification.

My invention relates to an improved apparatus for separating carbonaceous and hydrocarbonaceous residues from liquids containing the same, such liquids resulting from the washing of commercial gas in its manufacture.

My invention therefore resides in the novel construction, combination, and arrangement of parts for the above ends hereinafter fully specified, and particularly pointed out in the claims.

In the accompanying drawings, Figure 1 is a longitudinal section of the apparatus. Fig. 2 is a plan view of the same. Fig. 3 is an enlarged transverse section of the same.

Referring to the drawings, 1 represents a tank into which the liquid containing the residues is conducted by a flume 2. In the bottom of said tank, at the end next said flume are arranged a series of graduated partitions 3, increasing in height according to their distances from the flume. These partitions successively arrest the solid particles suspended in the liquid and cause them either to sink to the bottom or to rise to the top of the liquid, according to their specific gravity. The lighter residues rising to the top pass between transverse beams 4, extending between the sides of the tank, and are by them arrested, the liquid flowing on through the tank underneath the residues. In like manner at the end of the tank farthest from the flume is a second series of depending vertical partitions 5, increasing in depth according to their distances from the flume, and the residues which have escaped the aforesaid partition and beams are arrested by these partitions 5 and for the most part rise to the top of the water.

6 represents scrapers attached to endless chains 7, running around wheels 8 on shafts 10, one of said shafts being driven by a pulley 11 from any suitable source of power. These scrapers scrape off the tops of the residues and push them over the side of the tank, depositing them upon a pile at said side, said pile being shown at 12 in Fig. 3. Thus at all times the accumulations of these residues at the top of the liquid are removed from the top as fast as they accumulate underneath the masses of residues. The liquid thus separated from the residues flows through screens 13, by which it is filtered, and finally passes out by a channel 14.

I claim—

1. In an apparatus of the character described, the combination of a tank, an inlet and an outlet for the liquid containing the residues, a series of vertical partitions increasing in depth according to their distances from the inlet, and a scraper scraping the residues from the surface of the liquid, substantially as described.

2. In an apparatus of the character described, the combination of a tank, an inlet and an outlet for the liquid containing the residues, a series of upwardly-extending partitions increasing in height according to their distances from the outlet, a second series of downwardly-extending partitions increasing in depth according to their distances therefrom, and scrapers moving transversely or parallel with the partitions, for scraping the residues from the surface of the liquid, substantially as described.

In witness whereof I have hereunto set my hand in the presence of two subscribing witnesses.

L. P. LOWE.

Witnesses:
 FRANCIS M. WRIGHT,
 BESSIE GORFINKEL.